June 17, 1930.  G. C. HUME  1,764,512
HOISTING TACKLE
Filed March 26, 1928
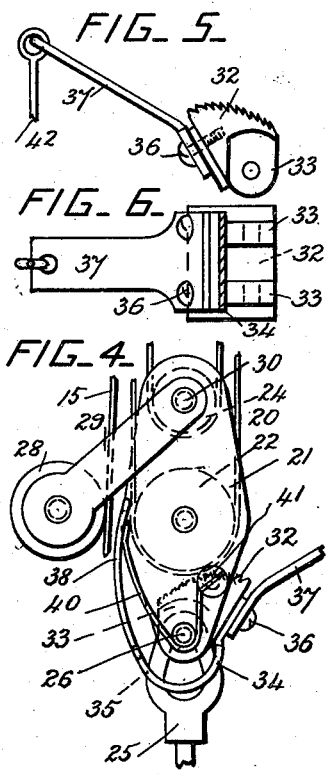
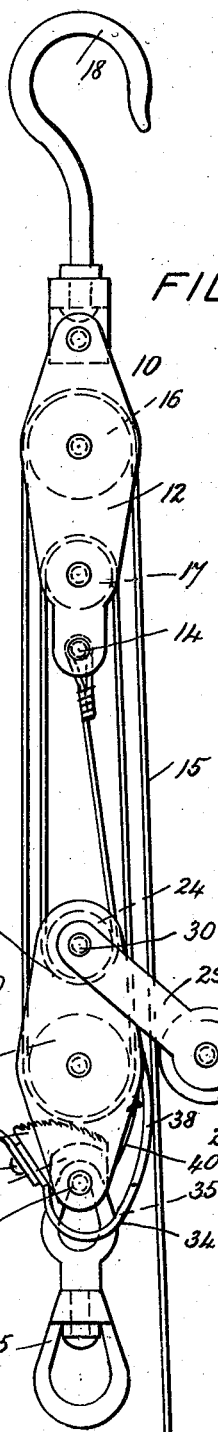
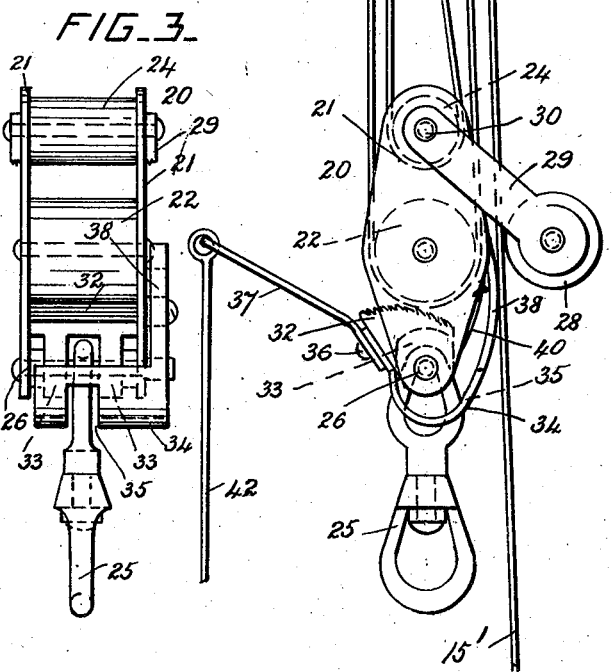
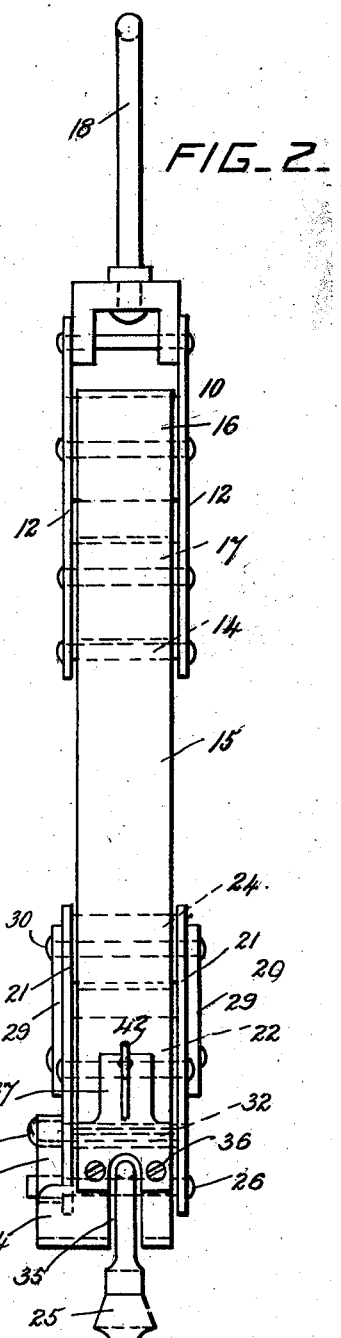
Inventor
George C. Hume
by Herbert W. Jenner
Attorney Patented June 17, 1930

1,764,512

UNITED STATES PATENT OFFICE

GEORGE C. HUME, OF CHILTON, WISCONSIN

HOISTING TACKLE

Application filed March 26, 1928. Serial No. 264,598.

This invention relates to hoisting tackle provided with pulley blocks; and it consists in the novel construction and combination of the parts hereinafter fully described and claimed whereby the tackle is adapted for use with flat bands instead of ropes or chains, and whereby the load is sustained automatically, and has its descent regulated by hand. This tackle is useful for many purposes, such as for supporting the operator in cleaning the windows of high buildings, in repairing chimney stacks, and in mounting electric wires on poles.

In the drawings, Fig. 1 is a side view of a hoisting tackle constructed according to this invention. Fig. 2 is a view showing the tackle turned one-quarter around from the position shown in Fig. 1. Fig. 3 is a view of the lower block with the drop roller and hoisting band removed, looking in the opposite direction from Fig. 2. Fig. 4 is a side view of the lower block looking at the opposite side from that shown in Fig. 1. Fig. 5 is a detail side view of the cam-shaped catch and its releasing arm. Fig. 6 is a plan view of the same, from below and showing a portion of the part 34 in section.

The upper block 10 has two side plates 12, and a crossbar 14 is secured between their lower parts. A flat band or strap 15 is used in place of the usual rope or chain, and one end of this band is secured to the crossbar 14. The band is preferably formed of canvas, but any other flexible material can be used. A large upper roller 16 and a smaller lower roller 17 are journaled on suitable pins between the side plates 12. A suspension hook 18, or other similar device, is pivoted to the upper part of the block 10.

The lower block 20 has side plates 21, and a large lower roller 22 and a smaller upper roller 24 are journaled on suitable pins between the side plates 21. The lower block 20 has a swivel 25, or other similar lifting device, pivoted loosely on a pin 26 which extends between the lower parts of the side plates 21. The rollers 17 and 24 are made smaller than the rollers 16 and 22 so that the stretches of the band 15 will work clear of each other. The band 15 passes from the crossbar 14, under the smaller roller 24, thence over the small roller 17, thence downwardly under the large roller 22, and upwardly over the large roller 16, and its fall 15′ extends downwardly to any convenient point.

A drop roller 28 is pivoted by arms 29 to the upper parts of the side plates of the lower block 20 by a pin 30, which is preferably the pin on which the roller 24 is journaled. The drop roller bears on the outer side of the fall 15′ and presses it towards the adjacent stretch of the strap where the stretch engages with the lower roller 22.

When the tackle is used to support an operator who washes the windows of a high building, the tackle is suspended by the hook 18 from any suitable support, and the operator is suspended from the swivel 25 by any suitable sling. The fall 15′ may be attached to the sling by any suitable clip so that it may always be within the reach of the operator.

An automatic catch 32 for the band is pivoted on the pin 26. This catch 32 is a cam provided with a serrated outer surface, and it is pivoted to the pin 26 by a double-eye 33 which straddles the upper eye of the swivel 25. A curved frame 34 is provided and has a slot 35 to accommodate the upper eye of the swivel. One end of the frame is secured to the catch 32 by screws 36, and this end of the frame is provided with a releasing arm 37 which is preferably secured to it and to the catch by the same screws 36. The frame and the arm may however be secured together and to the catch in any other approved way.

The other end of the frame is provided with an arm 38 which projects upwardly from it outside the adjacent side plate of the block. A spring 40 is secured to the said side plate of the block by a screw 41, and this spring passes under an extension of the pin 26, and bears against the upper part of the arm 38, and operates to hold the serrated cam catch 32 in engagement with the band, so that the catch grips the band against the large lower roller 22, and normally sustains the load. The band is released from the catch by the operator who pulls on a cord or chain 42 which is attached to the free end portion of the releasing arm 37, and which hangs within his reach.

The operator can lower himself by pulling the cord 42. His own weight then effects the lowering, which he can control by holding the fall 15' of the band and also the cord 42, and he can raise himself by pulling on the fall of the band. The operator can also raise and lower any other load when he is standing on the ground and the fall and the cord 42 are within reach of his grasp.

What I claim is:

1. A tackle, comprising an upper block provided with rollers, a band secured at one end to the upper block, a lower block also provided with rollers, the said band being arranged to pass over the rollers of both blocks and having a fall which extends downwardly from the upper block and hangs clear of the lower block, a cam-shaped sustaining catch pivoted to the lower block and provided with a depressible releasing arm, a pivot pin supporting the said catch, and a spring carried by the lower block and operating the catch so as to normally grip the band against one of the rollers of the lower block and support the said arm in its raised position.

2. A tackle as set forth in claim 1, the said lower block having also a lifting member pivoted on the pin of the said catch, and having also a frame secured to the said catch and provided with a slot for the lifting member to pass through, and having also an upwardly projecting arm for the said spring to engage with.

3. A tackle as set forth in claim 1, the pivot pin of the said catch being provided with an extension, the said spring being secured at one end to the lower block and passing under the said extension, and a frame secured to the said catch and releasing arm and provided with an upwardly projecting arm for the free end of the said spring to bear against.

4. A tackle as set forth in claim 1, and having also downwardly and laterally inclined arms pivoted to the upper part of the lower block, and a drop roller journaled in the said arms and operating to press the fall of the said band towards the lower block.

5. A tackle, comprising an upper block and a lower block, a band secured at one end to the upper block and having its fall depending from the upper block and hanging clear of the lower block, a cam-shaped catch pivoted to the lower block and provided with a depressible releasing arm, and a spring carried by the lower block and operating the catch so as to normally grip the band in the lower block and support the said arm in its raised position.

In testimony whereof I have affixed my signature.

GEORGE C. HUME.